(12) United States Patent
Hashimoto et al.

(10) Patent No.: US 7,999,896 B2
(45) Date of Patent: Aug. 16, 2011

(54) LIQUID CRYSTAL DISPLAY UNIT

(75) Inventors: Yoshito Hashimoto, Nabari (JP); Masumi Kubo, Ikoma (JP); Akihiro Yamamoto, Yamatokoriyama (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/656,396

(22) Filed: Jan. 28, 2010

(65) Prior Publication Data

US 2010/0134738 A1    Jun. 3, 2010

Related U.S. Application Data

(63) Continuation of application No. 12/088,034, filed as application No. PCT/JP2006/319298 on Sep. 28, 2006, now Pat. No. 7,679,703.

(30) Foreign Application Priority Data

Sep. 30, 2005 (JP) ................................. 2005-286033

(51) Int. Cl.
*G02F 1/1337* (2006.01)
(52) U.S. Cl. ........................................ 349/123; 349/128
(58) Field of Classification Search .................. 349/123, 349/124, 125, 128, 129, 144
See application file for complete search history.

(56) References Cited

U.S. PATENT DOCUMENTS

| | | | |
|---|---|---|---|
| 5,578,351 A * | 11/1996 | Shashidhar et al. | ......... 428/1.23 |
| 5,824,377 A * | 10/1998 | Pirwitz et al. | ................ 428/1.23 |
| 6,141,075 A | 10/2000 | Ohmuro et al. | |
| 6,512,564 B1 | 1/2003 | Yoshida et al. | |
| 6,856,368 B2 | 2/2005 | Terashita et al. | |
| 2005/0088598 A1 | 4/2005 | Matsumori et al. | |
| 2009/0086141 A1* | 4/2009 | Shoraku et al. | ............... 349/123 |
| 2009/0225246 A1* | 9/2009 | Shoraku et al. | ................. 349/39 |

FOREIGN PATENT DOCUMENTS

| | | |
|---|---|---|
| JP | 10/123576 | 5/1998 |
| JP | 11/133429 | 5/1999 |
| JP | 11/352486 | 12/1999 |

(Continued)

OTHER PUBLICATIONS

International Search Report for National Phase Application No. PCT/JP2006/319298, mailed Oct. 31, 2006.

(Continued)

*Primary Examiner* — Akm E Ullah
(74) *Attorney, Agent, or Firm* — Nixon & Vanderhye, P.C.

(57) ABSTRACT

A liquid crystal display device according to the present invention includes: a vertical alignment liquid crystal layer; first and second electrodes arranged on one surface of first and second substrates to face the liquid crystal layer; and first and second alignment films arranged on the first and second electrodes, respectively, in contact with the liquid crystal layer. The first alignment film has been subjected to an optical alignment treatment by obliquely irradiating a first alignment film material, having a photosensitive wavelength within the wavelength range of 250 nm to 380 nm, with light including the photosensitive wavelength. The device further includes: a metal layer arranged between the first alignment film and the first substrate; and a first resin layer arranged between the metal layer and the first alignment film. The first resin layer has an optical property that attenuates the intensity of light, which has been incident on the first resin layer and then reflected from the metal layer, to 60% or less at the photosensitive wavelength.

1 Claim, 2 Drawing Sheets

FOREIGN PATENT DOCUMENTS

| | | |
|---|---|---|
| JP | 2001-174635 | 6/2001 |
| JP | 2001-272682 | 10/2001 |
| JP | 2001-281669 | 10/2001 |
| JP | 2002-277877 | 9/2002 |
| JP | 2004-037714 | 2/2004 |
| JP | 2005-062512 | 3/2005 |
| JP | 2005-128359 | 5/2005 |

OTHER PUBLICATIONS

English translation International Preliminary Report on Patentability mailed Apr. 10, 2008 in corresponding PCT Application No. PCT/JP2006/319298.

* cited by examiner

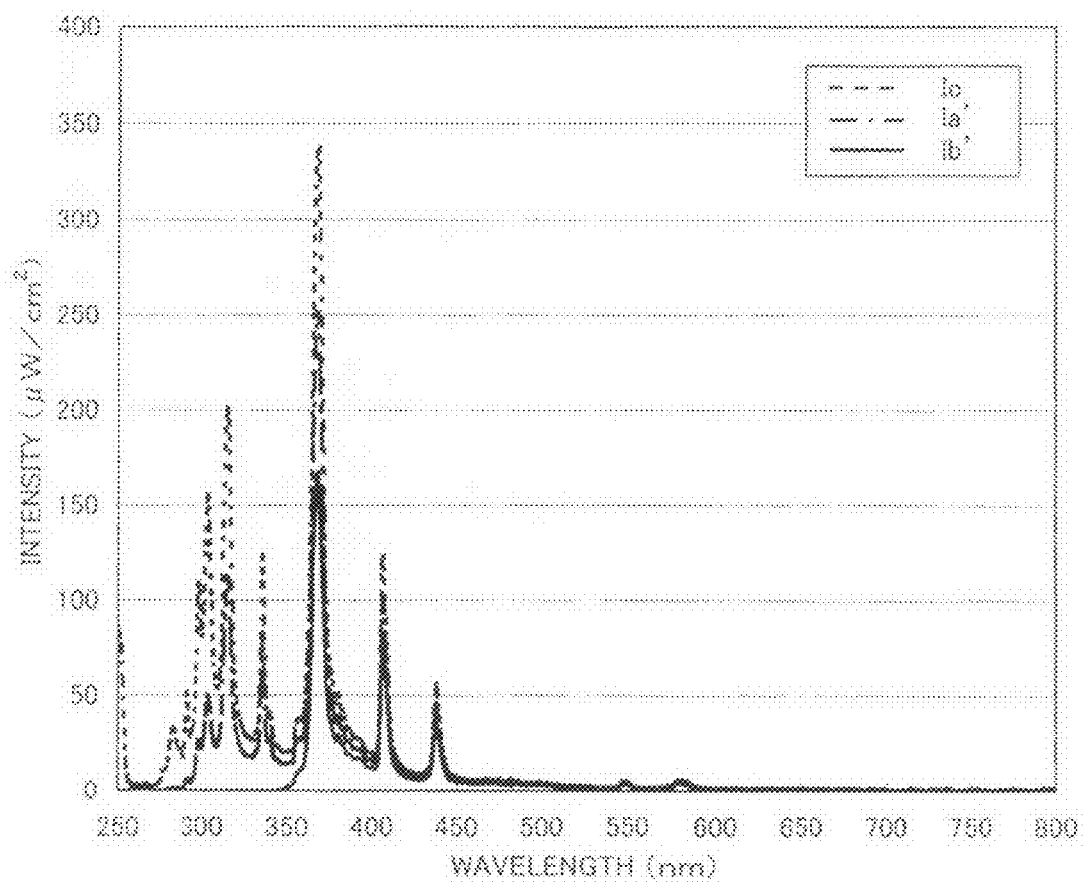
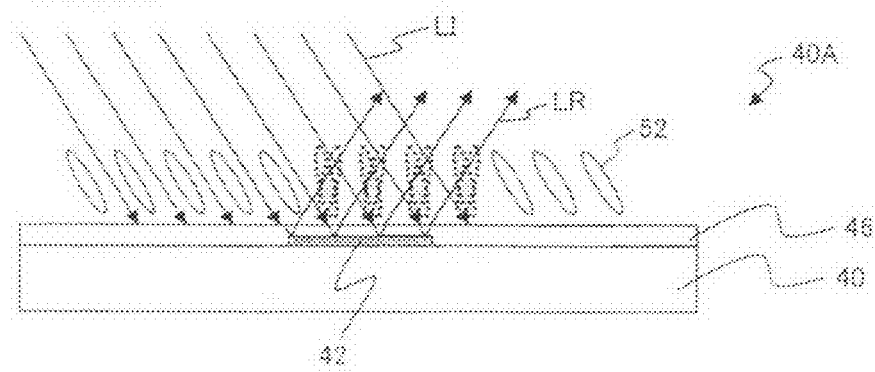

LIQUID CRYSTAL DISPLAY UNIT

This application is a continuation of U.S. patent application Ser. No. 12/088,034, filed 25 Mar. 2008 now U.S. Pat. No. 7,797,703, which is the U.S. national phase of International Application No. PCT/JP2006/319298, filed 28 Sep. 2006, which designated the U.S. and claims priority to JP 2005-286033 filed 30 Sep. 2005, the entire contents of each of which are hereby incorporated by reference.

TECHNICAL FIELD

The present invention relates to a liquid crystal display device and more particularly relates to a liquid crystal display device with a wide viewing angle characteristic.

BACKGROUND ART

Recently, the display performances of liquid crystal displays (LCDs) have been improved to the point that more and more manufacturers adopt LCD panels as TV monitors, for example. As a result of those researches and developments, the viewing angle characteristic of LCDs has been improved to a certain degree but not satisfactorily in some respects. Among other things, there is still a high demand for improvement of the viewing angle characteristic of an LCD using a vertical alignment liquid crystal layer (which is sometimes called a "VA mode LCD"). As used herein, a "vertical alignment liquid crystal layer" refers to a liquid crystal layer in which liquid crystal molecules are aligned so as to have their axis form an angle of (i.e., have a pretilt angle of) approximately 85 degrees or more with respect to the surface of a vertical alignment film. The liquid crystal molecules have negative dielectric anisotropy and the VA mode LCD is combined with polarizers that are arranged as crossed Nicols to conduct a display operation in a normally black mode.

A VA mode LCD, which is currently used for a TV set with a big screen, for example, adopts a multi-domain structure in which multiple liquid crystal domains are formed in a single pixel region, to improve the viewing angle characteristic. An MVA mode is often adopted as a method of forming such a multi-domain structure. Specifically, according to the MVA mode, an alignment control structure is provided on one side of the two substrates, which face each other with a vertical alignment liquid crystal layer interposed between them, so as to face the liquid crystal layer, thereby forming multiple domains with mutually different alignment directions (i.e., tilt directions), the number of which is typically four. As the alignment control structure, a slit (as an opening) or a rib (as a projection structure) may be provided for an electrode, thereby creating an anchoring force from both sides of the liquid crystal layer.

If a slit or a rib is adopted, however, the anchoring force will be applied onto liquid crystal molecules non-uniformly within a pixel region because the slit or rib has a linear structure unlike the situation where the pretilt directions are defined by an alignment film in a conventional TN mode LCD. As a result, the response speed may have a distribution unintentionally. In addition, since the transmittance of light will decrease in the areas with the slits or ribs, the luminance on the screen will decrease, too.

To avoid these problems, the VA mode LCD also preferably has a multi-domain structure by defining a pretilt direction with an alignment film.

Examples of VA mode LCDs with an alignment control structure for controlling the pretilt directions with an alignment film include a VAECB (vertical alignment electrically controlled birefringence) mode LCD (see Patent Document No. 1, for example), an RTN (reverse twisted nematic) mode LCD and a VATN (vertical alignment twisted nematic) mode LCD (see Patent Documents Nos. 2 to 5, for example).

In the VAECB mode LCD, the pretilt directions of liquid crystal molecules, which are defined by two alignment films that face each other through a liquid crystal layer, are antiparallel to each other in an arbitrary domain in a pixel. That is why the tilt direction of liquid crystal molecules around the middle of the thickness of the liquid crystal layer agrees with the pretilt direction defined by the alignment film on the lower substrate. In this case, the tilt direction of those liquid crystal molecules is an azimuthal direction indicated by the arrow that represents the tip of the liquid crystal molecules pointing toward the viewer when the LCD is viewed by the viewer. Also, the tilt directions of the liquid crystal molecules are constant irrespective of the position in the thickness direction of the liquid crystal layer or the magnitude of the applied voltage.

On the other hand, in the RTN mode, the pretilt directions of liquid crystal molecules that are defined by the two vertical alignment films in an arbitrary domain of a pixel are substantially perpendicular to each other. Also, in the RTN mode, when a sufficiently high voltage (which is at least equal to a signal voltage to display the highest gray scale) is applied to the liquid crystal layer, liquid crystal molecules, located around the center of a plane of the liquid crystal layer and around the middle of the thickness of the liquid crystal layer, are tilted in a direction that substantially equally divides the two pretilt directions defined by the alignment films into two.

Examples of known methods for getting the pretilt directions defined by vertical alignment films include a process that requires a rubbing treatment and a process that requires an optical alignment treatment. Among other things, the optical alignment treatment can be done on the alignment films without making any physical contact with them. That is why unlike the rubbing treatment, the optical alignment treatment would produce no static electricity and could increase the yield. Furthermore, as disclosed in Japanese Patent Application No. 2005-141846 that was filed by the applicant of the present application, by using an optical alignment film including a photosensitive group that can form a bond structure, the variation in the pretilt angle can be reduced to one degree or less. As a result, the display luminance characteristic can be improved.

However, the optical alignment treatment has its own problems.

For example, Patent Document No. 6 discloses a technique for reducing the optical deterioration of an optical alignment film by arranging a member that absorbs UV rays between the optical alignment film that is located closest to the viewer and the uppermost surface for the viewer.

On the other hand, Patent Document No. 7 discloses a technique for minimizing the disturbance in alignment treatment that would be caused by light reflected from a taper portion of a metallic electrode, which is provided to produce a lateral electric field in a pixel, in a situation where the optical alignment treatment is adopted to fabricate an IPS mode LCD.

Patent Document No. 1: Japanese Patent Application Laid-Open Publication No. 2001-281669

Patent Document No. 2: Japanese Patent Application Laid-Open Publication No. 11-352486

Patent Document No. 3: Japanese Patent Application Laid-Open Publication No. 2002-277877

Patent Document No. 4: Japanese Patent Application Laid-Open Publication No. 11-133429

Patent Document No. 5: Japanese Patent Application Laid-Open Publication No. 10-123576

Patent Document No. 6: Japanese Patent Application Laid-Open Publication No. 2001-272682

Patent Document No. 7: Japanese Patent Application Laid-Open Publication No. 2005-128359

DISCLOSURE OF INVENTION

Problems to be Solved by the Invention

The method disclosed in Patent Document No. 6 can be used effectively to minimize optical deterioration of an optical alignment film but cannot prevent its alignment treatment from being disturbed by light reflected from an underlying metal layer when an optical alignment treatment is adopted to make a VA mode LCD with a multi-domain structure.

Meanwhile, the method disclosed in Patent Document No. 7 is effectively applicable to an IPS mode LCD, but not to a VA mode LCD. The reason is as follows. Specifically, an IPS mode LCD conducts a display operation by getting liquid crystal molecules aligned by a lateral electric field generated between metallic electrodes in a pixel, and therefore, does not use areas on those electrodes for display purposes. On the other hand, a VA mode LCD conducts a display operation by using an electric field generated between electrodes that are located over and under a liquid crystal layer, and therefore, can apply a predetermined voltage to every area within a pixel and can use basically the entire pixel for display purposes. That is why if the manufacturing process of a VA mode LCD included an optical alignment treatment, then light reflected form a metal layer under an optical alignment film (including lines or electrodes made of the metal layer or an opaque layer) would disturb the alignment treatment, thus eventually debasing the display quality. Hereinafter, this problem will be described with reference to FIG. 4.

Optical alignment films may be roughly classified into the following two types according to their mechanisms of producing anchoring force that defines the pretilt direction of liquid crystal molecules. One is an optical alignment film that uses a polarized UV ray and produces anchoring force either parallel or perpendicularly to its polarization direction. The other is an optical alignment film to be irradiated obliquely with light and to produce anchoring force in a direction corresponding to the direction that the light has come from. In the latter case, however, the incoming light only needs to be incident on the film obliquely and may be polarized in some cases. For example, a P-polarized ultraviolet ray may be incident on the film so as to form an angle of incidence of 20 to 60 degrees (with respect to a normal to the film plane) as will be described later.

In the latter optical alignment film, the direction in which the anchoring force is produced is defined by the direction in which the light is coming in the optical alignment treatment. That is why in making such an optical alignment film, if an optical alignment film material film 46 that has been deposited so as to cover a metal layer 42 on a substrate 40 were irradiated obliquely with light LI including the photosensitive wavelength of the optical alignment film material, then the light LR reflected from the metal layer 42 would enter the optical alignment film material film 46 again and would affect its property. More specifically, since the direction in which the reflected light LR enters the optical alignment film material film 46 is different from the direction of the incoming light LI, the anchoring force would be produced in non-uniform directions and the liquid crystal molecules could not be aligned in a predetermined pretilt direction in the areas irradiated with the reflected light LR. The methods disclosed in Patent Document Nos. 6 and 7 cannot resolve this problem.

In order to overcome the problems described above, the present invention has an object of providing a VA mode liquid crystal display device that would not have its alignment state disturbed even if its manufacturing process included an optical alignment treatment.

Means for Solving the Problems

A liquid crystal display device according to the present invention includes: a vertical alignment liquid crystal layer; first and second substrates that face each other with the liquid crystal layer interposed between them; a first electrode, which is arranged on one surface of the first substrate so as to face the liquid crystal layer, and a second electrode, which is arranged on one surface of the second substrate so as to face the liquid crystal layer; and a first alignment film, which is arranged on the first electrode so as to contact with the liquid crystal layer, and a second alignment film, which is arranged on the second electrode so as to contact with the liquid crystal layer. The first alignment film has been subjected to an optical alignment treatment by obliquely irradiating a first alignment film material, having a photosensitive wavelength within the wavelength range of 250 nm to 380 nm, with light including the photosensitive wavelength. The device further includes: a metal layer arranged between the first alignment film and the first substrate; and a first resin layer arranged between the metal layer and the first alignment film. The first resin layer has an optical property that attenuates the intensity of light, which has been incident on the first resin layer and then reflected from the metal layer, to 60% or less at the photosensitive wavelength.

In one preferred embodiment, the first resin layer exhibits a transmittance of 90% or more with respect to light falling within the wavelength range of 400 nm to 800 nm.

In another preferred embodiment, the first resin layer has photosensitivity.

In still another preferred embodiment, the first resin layer has a thickness of 1 μm to 5 μm.

In yet another preferred embodiment, the first alignment film has at least two areas in a pixel, and the two areas give mutually different pretilt directions to liquid crystal molecules.

In yet another preferred embodiment, the metal layer includes at least one member selected from the group consisting of a gate bus line, a source bus line, a CS bus line and an opaque layer.

Effects of the Invention

The present invention provides a VA mode liquid crystal display device that would not have its alignment state disturbed even if its manufacturing process included an optical alignment treatment. As a result, the display quality and reliability of a VA mode liquid crystal display device, having a multi-domain structure formed by an optical alignment treatment, among other things, can be improved.

BRIEF DESCRIPTION OF DRAWINGS

FIG. 3 shows the emission spectrum IO of a light source for use in the optical alignment treatment and the intensity spectra Ia' and Ib' of the reflected light with the films a and b, respectively.

FIG. 4 is a schematic representation illustrating a problem with a conventional optical alignment treatment.

DESCRIPTION OF REFERENCE NUMERALS

| | |
|---|---|
| 10 | glass substrate |
| 10A | TFT substrate |
| 12 | metal layer |
| 14 | short wave absorbing resin layer |
| 15 | pixel electrode |
| 16 | optical alignment film |

BEST MODE FOR CARRYING OUT THE INVENTION

Hereinafter, a configuration for a liquid crystal display device as a preferred embodiment of the present invention will be described with reference to the accompanying drawings. In the preferred embodiment to be described below, the present invention is implemented as TFT LCD. However, the present invention is in no way limited to such a specific preferred embodiment but is applicable broadly to any other type of LCD with a metal layer on one of its substrates.

Figure 1:
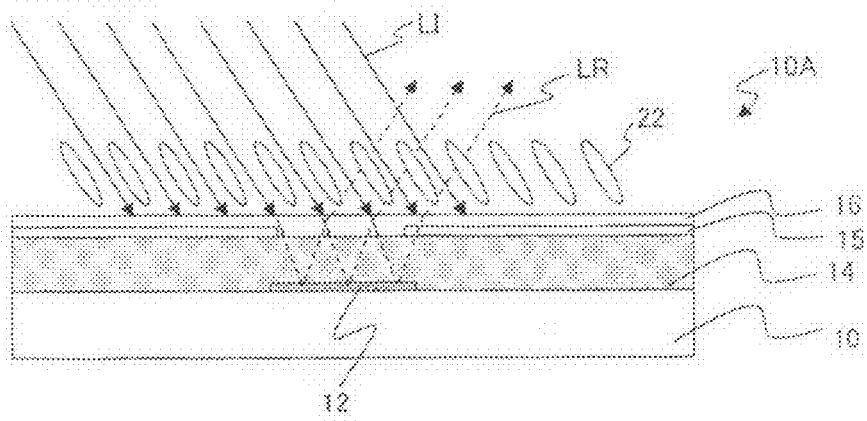
FIG. 1 is a schematic cross-sectional view illustrating how an optical alignment treatment process is carried out on a TFT substrate 10A for use to make a VA mode LCD as a preferred embodiment of the present invention.

FIG. 1 is a schematic cross-sectional view illustrating how an optical alignment treatment process is carried out on a TFT substrate 10A for use to make a VA mode LCD as a preferred embodiment of the present invention. FIG. 1 also schematically illustrates how liquid crystal molecules are aligned in a predetermined pretilt direction by an optical alignment film 16.

The TFT substrate 10A includes a glass substrate 10 and a metal layer 12, which forms at least a part of a TFT (not shown), a gate line, a source bus line or a CS bus line that is arranged on the glass substrate 10. A short wave absorbing resin layer 14 is further deposited so as to cover the metal layer 12. A pixel electrode 15 made of a transparent conductive layer (such as an ITO layer) is arranged on the short wave absorbing resin layer 14. And an optical alignment film 16 has been deposited over almost the entire surface of the substrate as well as over the pixel electrode 15. In this example, the film of an optical alignment film material that has not been subjected to an optical alignment treatment yet and the optical alignment film obtained by the treatment will be identified by the same reference numeral for the sake of simplicity.

The optical alignment film material to make the optical alignment film 16 has a photosensitive wavelength within the wavelength range of 250 nm to 380 nm and is subjected to an optical alignment treatment by being obliquely irradiated with light LI including the photosensitive wavelength. Specifically, the optical alignment film material absorbs light with the photosensitive wavelength and produces a chemical reaction (such as decomposition or formation of chemical bonds) to be an alignment film that produces anchoring force in a predetermined direction.

As the optical alignment film material to be subjected to the alignment treatment by being obliquely irradiated with light, an optical alignment film material including a photosensitive group with a photosensitive wavelength of 380 nm or less is preferably used as disclosed in Japanese Patent Application No. 2005-141846, which was filed by the applicant of the present application. The photosensitive group preferably forms a bonding structure and includes at least one photosensitive group selected from the group consisting of cinnamoyl group (I), coumarin group (II), 4-carcone group (III) and 4'-carcone group (IV) as represented by Chemical Formula (1). The optical alignment film material preferably produces a photodimerization reaction when irradiated with an ultraviolet ray. By adopting such an optical alignment film material and setting the difference between the pretilt angles defined by a pair of alignment films to one degree or less, the display luminance characteristic can be improved. The light to cast to get the optical alignment treatment done is an ultraviolet ray with a photosensitive wavelength of 380 nm or less and is preferably a P-polarized ultraviolet ray. The angle of incidence on the alignment film (i.e., the angle defined with respect to a normal to the film plane) preferably falls within the range of 20 to 60 degrees, more preferably within the range of 30 to 50 degrees, and most preferably around 40 degrees.

[Chemical formula 1]

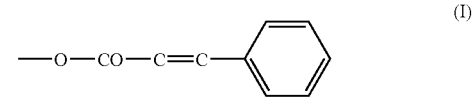
(I)

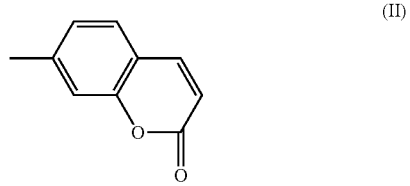
(II)

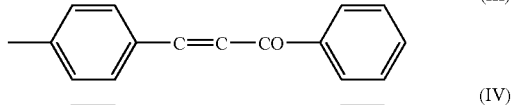
(III)

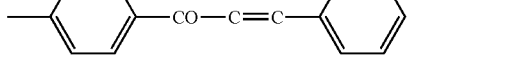
(IV)

In this preferred embodiment, the TFT substrate 10A includes the short wave absorbing resin layer 14 between the optical alignment film 16 and the metal layer (such as a gate bus line) 12. That is why the intensity of the reflected light LR that has entered the alignment film 16 again after having been transmitted through the optical alignment film 16 and then reflected from the metal layer 12 can be attenuated sufficiently. That is to say, the short wave absorbing resin layer 14 has such an optical property as to sufficiently decrease the intensity of the light with the photosensitive wavelength that has entered the short wave absorbing resin layer 14 and has been reflected from the metal layer 12. Consequently, even if the reflected light LR enters the optical alignment film 16 again, the optical alignment film does not substantially change its properties and can exert the anchoring force that has been produced by an optical alignment treatment with the light LI just as expected.

Hereinafter, the optical property that the short wave absorbing resin layer 14 should have will be described in detail.

The light LI to shine on the film to get the optical alignment treatment done is usually an ultraviolet (UV) ray including light falling within the wavelength range of 250 nm to 380 nm. The UV ray LI that irradiates the optical alignment film (or more exactly, a film of the optical alignment film material)

16 is partially absorbed into the optical alignment film 16. On the other hand, the transmitted part of the UV ray LI is incident on, and reflected from, the metal layer 12 and then enters the optical alignment film 16 again. Meanwhile, the light LI that has been incident on the optical alignment film 16 over the pixel electrode 15 made of an ITO layer enters the optical alignment film 16 again after having been transmitted through the pixel electrode 15 twice.

The optical alignment film 16 normally has a thickness of 0.5 µm to less than 1.0 µm and absorbs the incoming light little. Also, as the chemical reaction advances upon the exposure to the light, the absorbance at the photosensitive wavelength decreases. The ITO layer that is the material of the pixel electrode 15 also absorbs an ultraviolet ray but sometimes cannot reduce the intensity at the photosensitive wavelength sufficiently. Furthermore, since the UV ray is cast obliquely, part of the UV ray may pass through the gap of the pixel electrode 15, be reflected from the metal layer 12, pass through either the gap of the pixel electrode 15 or the pixel electrode 15 itself, and then enter the optical alignment film 16. Consequently, the optical alignment film 16 is seriously affected by the reflected light LR particularly around the edges of the pixel electrode 15.

In the VA mode, an oblique electric field, generated in the vicinity of the edge portions of the pixel electrode 15, has influence on the tilt directions of liquid crystal molecules. For that reason, unless the optical alignment treatment on those edge portions of the pixel electrode 15 got stabilized, the display quality would deteriorate. For example, in the VATN mode (RTN mode) disclosed in Japanese Patent Application No. 2005-169423, which was filed by the applicant of the present application, a dark line (i.e., a domain line), which is produced in an area where the direction of the oblique electric field at the edge portions of the pixel electrode and the pretilt direction defined by the alignment film are different from each other (i.e., in the vicinity of the edge of the right-hand-side portion of the pixel electrode 15 shown in FIG. 1), penetrates deep into a pixel (i.e., shifts toward the center of the pixel). Also, if the multi-domain structure is adopted, a similar defect will occur not just in the edge portions but also in the vicinity of a domain boundary around the center of a pixel.

That is why to overcome such a reflected light problem, the intensity of the UV ray needs to be decreased sufficiently by the short wave absorbing resin layer 14 that is arranged between the optical alignment film 16 and the metal layer 12. However, if the thickness of the short wave absorbing resin layer 14 exceeded 5 µm, a significant parallax (i.e., influence of the oblique incidence) would be produced due to the thickness of the short wave absorbing resin layer 14. Nevertheless, if the thickness of the short wave absorbing resin layer 14 were less than 1 µm, then it would be difficult to deposit that thin short wave absorbing resin layer 14 just as intended. For these reasons, the short wave absorbing resin layer 14 preferably has a thickness of 1 µm to 5 µm. Furthermore, as visible radiation for use in a display operation also passes through the short wave absorbing resin layer 14, the short wave absorbing resin layer 14 preferably exhibits high transmittance with respect to the visible radiation. Specifically, the short wave absorbing resin layer 14 preferably has a transmittance of at least 80%, and more preferably 90% or more, with respect to light falling within the wavelength range of 400 nm to 800 nm. The light emitted from a backlight for display purposes passes through the short wave absorbing resin layer 14 only once. For that reason, the "transmittance" refers herein to the transmittance of the short wave absorbing resin layer 14 itself.

Figure 2:
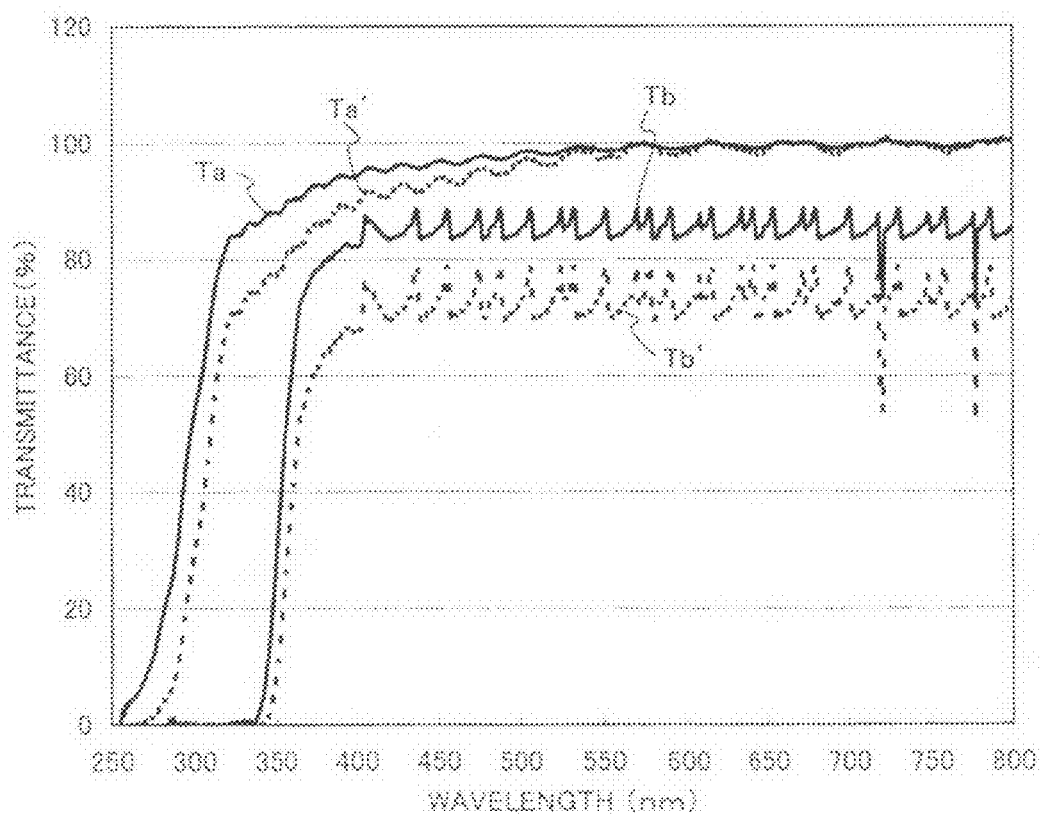
FIG. 2 shows the transmittance spectra Ta and Tb of two types of short wave absorbing resin layers (films a and b).

The results of our analysis on the transmittance with respect to a UV ray will be described with reference to FIGS. 2 and 3. Specifically, FIG. 2 shows the transmittance spectra Ta and Tb of the two types of short wave absorbing resin layers that were used in this example (which will be referred to herein as "film a" and "film b", respectively). The dashed transmittance curves Ta' and Tb' show the results obtained when the thicknesses of the films that ended up with the solid transmittance curves were doubled. In this case, the transmittance with respect to the UV ray at the photosensitive wavelength that would have a harmful effect on the alignment treatment of the optical alignment film is represented by the dashed transmittance curves of the films with the doubled thicknesses. On the other hand, the transmittance with respect to the visible radiation may be estimated by the solid transmittance curves.

The film a was made of an acrylate resin with photosensitivity. On the other hand, the film b was made of a mixture of the acrylate resin for the film a and a benzotriazole based UV sorbent. Both of these films had a thickness of 2 µm. Optionally, an organic material such as benzophenone can be used effectively as the UV sorbent. As the optical alignment film, a photodimerized one including cinnamoyl group (see Chemical Formula (1)) was used.

FIG. 3 shows the emission spectrum IO of a light source for use in the optical alignment treatment and the intensity spectra Ia' and Ib' of the reflected light with the films a and b, respectively. Ia' and Ib' were calculated as Ia'=IO×Ta'×0.9 and Ib'=IO×Tb'×0.9, respectively, where 0.9 is the reflectance in a situation where the metal layer 12 is an aluminum layer. Aluminum is one of the metals that have the highest reflectance of 90% with respect to a UV ray. In this case, the wavelength dispersion of the reflectance is not taken into consideration.

The results of the experiments revealed that even with the film a, the alignment state was not disturbed by the reflected light and a good VA mode LCD could be obtained. As for light irradiation conditions, a 10 mW P-polarized UV ray was cast for five seconds at an angle of incidence of 40 degrees (and with an intensity of 50 mJ). As shown in FIG. 3, even when the film a was used, the intensity Ia' of the light at 315 nm could be decreased to 60% of IO. Thus, it can be seen that a resin layer that has such an optical property as to decrease the intensity of the light that has been incident on the short wave absorbing resin layer 14 and then reflected from the metal layer 12 at the photosensitive wavelength to 60% or less may be used as the short wave absorbing resin layer 14.

Meanwhile, the transmittances of the films a and b with respect to visible radiation (as represented by the solid curves in FIG. 2) were both 80% or more. But the film a is preferred to the film b because the film a has a transmittance of more than 90%, which is higher than that of the film b, and would realize a brighter display.

In addition, the film a is made of a resin with photosensitivity, and therefore, a contact hole that electrically connects the pixel electrode 15 and the metal layer (e.g., the drain electrode layer of a TFT) 12 together may be made by a photolithographic process, which is beneficial.

A VA mode liquid crystal display device according to this preferred embodiment can be obtained by arranging a color filter substrate with respect to the TFT substrate 10A such that these two substrates face each other with a liquid crystal material with negative dielectric anisotropy interposed between them. The color filter substrate typically includes a glass substrate, a color filter layer that has been formed on the glass substrate by depositing color resin layers (such as red, green and blue resin layers) thereon, a black matrix made of a black resin layer, a counter electrode, and an optical alignment film that is arranged on one side of the counter electrode that will face the liquid crystal layer. Such a color filter substrate usually has no metal layer between the glass substrate and the optical alignment film, and therefore, would not cause the reflected light problem described above during the optical alignment treatment. However, if the black matrix is made of a metal layer, for example, the short wave absorbing resin layer is also preferably provided between the metal layer and the optical alignment film. As the color resin layers and the black resin layer absorb UV rays, the ability of the short wave absorbing resin layer of the color filter substrate to decrease the photosensitive wavelength may be lower than that of the short wave absorbing resin layer 14 of the TFT substrate.

Also, as described above, the optical alignment treatment is an important process step in the manufacturing process of a VA mode LCD that has a so-called "multi-domain structure" in which the optical alignment film has at least two areas with mutually different pretilt directions within a pixel. And the present invention is effectively applicable to such an LCD. Among other things, the present invention is particularly effectively applicable to a VATN mode LCD with a multi-domain structure as disclosed in Japanese Patent Application No. 2005-169423.

On top of that, the short wave absorbing resin layer can absorb not just the UV ray for use to perform the optical alignment treatment but also a UV ray included in the light emitted from a backlight and a UV ray included in the ambient light. That is why as in the LCD disclosed in Patent Document No. 6, the short wave absorbing resin layer 14 can also minimize the optical deterioration of the optical alignment film and improve its reliability.

The entire contents of Japanese Patent Application No. 2005-286033, on which the present application claims priority, and Japanese Patent Applications Nos. 2005-141846 and 2005-169423 mentioned above are all hereby incorporated by reference.

INDUSTRIAL APPLICABILITY

A liquid crystal display device according to the present invention can be used effectively in a TV receiver or any other device that should have improved display quality.

The invention claimed is:

1. A liquid crystal display device comprising:
   a liquid crystal layer;
   first and second substrates that face each other with the liquid crystal layer interposed between them;
   a backlight;
   a first electrode, which is arranged on one surface of the first substrate so as to face the liquid crystal layer, and a second electrode, which is arranged on one surface of the second substrate so as to face the liquid crystal layer; and
   a first alignment film, which is arranged on the first electrode so as to contact with the liquid crystal layer, and a second alignment film, which is arranged on the second electrode so as to contact with the liquid crystal layer,
   wherein the first alignment film has been subjected to an optical alignment treatment by irradiating a first alignment film material, having a photosensitive group that forms a bonding structure and having a photosensitive wavelength within the wavelength range of 250 nm to 380 nm, with light including the photosensitive wavelength, and
   wherein the device further includes: a metal layer arranged between the first alignment film and the first substrate; and a first resin layer arranged between the metal layer and the first alignment film, and
      wherein the first resin layer has an optical property that attenuates the intensity of light, which has been incident on the first resin layer and then reflected from the metal layer, to 60% or less at the photosensitive wavelength.

* * * * *

UNITED STATES PATENT AND TRADEMARK OFFICE
CERTIFICATE OF CORRECTION

PATENT NO.       : 7,999,896 B2  
APPLICATION NO.  : 12/656396  
DATED            : August 16, 2011  
INVENTOR(S)      : Hashimoto et al.

Page 1 of 1

It is certified that error appears in the above-identified patent and that said Letters Patent is hereby corrected as shown below:

On the cover page, please correct the Assignee (73) to read as follows:

(73) Assignee: SHARP KABUSHIKI KAISHA, Osaka-shi, Osaka (JP)

Signed and Sealed this
Twentieth Day of December, 2011

David J. Kappos
*Director of the United States Patent and Trademark Office*